United States Patent [19]
Rattlingourd et al.

[11] Patent Number: 4,771,426
[45] Date of Patent: Sep. 13, 1988

[54] ISOCHRONOUS CLOCK RECONSTRUCTION

[75] Inventors: Glen D. Rattlingourd; Richard K. Wells, both of Salt Lake City; James R. Nelson, Sandy, all of Utah

[73] Assignee: Unisys Corporation, Blue Bell, Pa.

[21] Appl. No.: 886,771

[22] Filed: Jul. 17, 1986

Related U.S. Application Data

[63] Continuation of Ser. No. 632,641, Jul. 20, 1984, abandoned.

[51] Int. Cl.$^4$ ............................................. H04J 3/06
[52] U.S. Cl. ................................. 370/102; 370/100; 375/120
[58] Field of Search ............... 320/100, 102; 375/118, 375/119, 120

[56] References Cited

U.S. PATENT DOCUMENTS

| | | | |
|---|---|---|---|
| 4,059,805 | 11/1977 | de Laage de Meux et al. | 375/120 |
| 4,085,288 | 4/1978 | Viswanathan | 375/120 |
| 4,143,246 | 3/1979 | Smith | 370/100 |
| 4,229,822 | 10/1980 | Bench | 375/120 |
| 4,259,738 | 3/1981 | Liskov et al. | 370/102 |
| 4,321,483 | 3/1982 | Dugan | 375/120 |
| 4,392,234 | 7/1983 | Maruta | 375/118 |
| 4,495,473 | 1/1985 | Treise | 375/120 |
| 4,542,500 | 9/1985 | Jean-Claude | 370/102 |

Primary Examiner—Douglas W. Olms
Assistant Examiner—Wellington Chin
Attorney, Agent, or Firm—Glenn W. Bowen; G. Donald Weber, Jr.; Laurence J. Marhoefer

[57] ABSTRACT

An electronic system for providing a stable, isochronous clock signal with very low jitter and slew rate to thereby permit multiplexing of data from an external source which is not synchronous with the multiplexer frame rate.

1 Claim, 4 Drawing Sheets

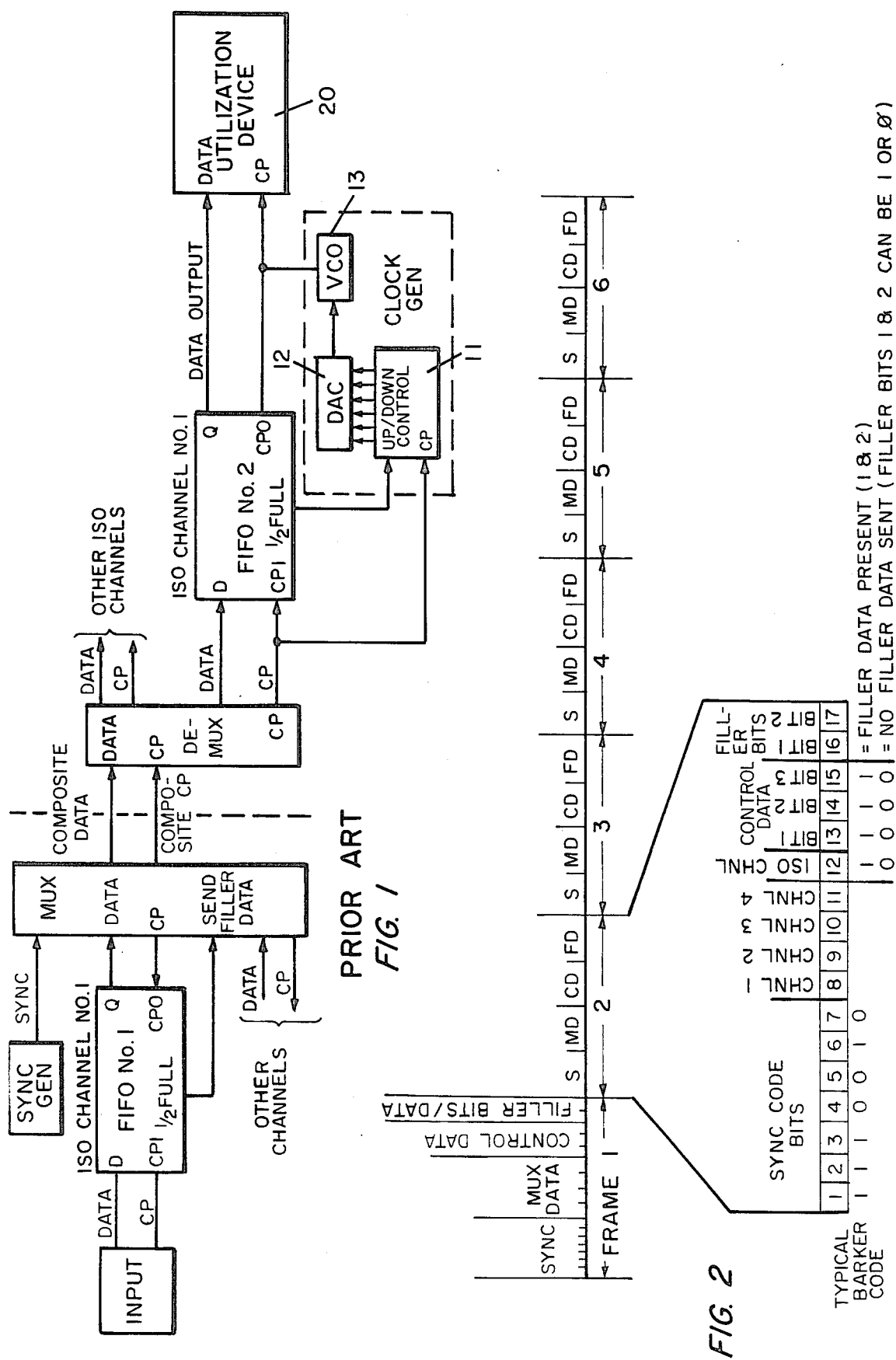

ISOCHRONOUS CLOCK RECONSTRUCTION

This is a continuation of application Ser. No. 632,641, filed July 20, 1984 now abandoned.

BACKGROUND

1. Field of the Invention.

This invention is directed to electronic systems for providing stable clock signals, in general, and to a system which provides stable clock signals with low jitter and low slew rate by using isochronous conversion techniques, in particular.

2. Prior Art.

There are many uses of multiplexing systems in the art. Many of these multiplexing systems require and/or provide an interface with data sources and data utilization devices which are not quite synchronized to the multiplexer. These data sources and utilization devices must then be synchronized in a separate operation. The technique of synchronizing a number of "near synchronous inputs" is known as "isochronous conversion."

In performing the multiplexing operations, the various input sources provide signals at specified data rates. The data rate which can be transferred through any multiplexer channel is limited to an integer multiple of the channel rate. As a consequence, differences between the data rate and the channel rate are not unusual. To permit system compatibility, any difference in the number of signals from the integer multiple is provided in the form of special data bits which are referred to as "filler data bits".

In particular, the filler data bits are a group of bits which are transferred in the multiplex format and which are reserved (or stored) to be periodically transmitted as the extra, accumulated bits of the isochronous channel. However, these filler data bits must be identified in the system so that the system will know whether to respond to filler data bits which contain real data or to ignore filler bits which contain no meaningful data. Consequently, control bits are usually transmitted as part of the signals so that the frame in which the filler data bits are stored can be properly identified.

Another aspect which must be considered is that the filler data bits are supplied in particular frames of the multiplexer operation but not in every frame of this operation. Thus, a number of data bits or information signals will be transmitted as a burst of information on the multiplexer channel. It is highly desirable to attempt to make this data transmission as smooth as possible so that the isochronous data channel appears essentially transparent to the user. In a typical configuration known in the prior art, the isochronous data channel includes a multiplexer (MUX) and a demultiplexer (DEMUX). Storage registers (FIFO) are associated with the input of the MUX and the output of the DEMUX. The FIFO registers produce control signals in the transmission channel in response to the application of signals thereto. The significant apparatus for controlling the transmission quality is usually in the DEMUX circuit portion. Typically, the bursts of data from the DEMUX are fed to the associated FIFO. This FIFO acts as a buffer to absorb the data bursts and provide a smooth data output by the clock provided by the clock generator. That is, the clock output signals of the clock generator should be identical to the clock input signals supplied to the MUX FIFO in both symmetry and jitter. This condition avoids degradation of the user data transfer and also allows proper interfacing with other transmission devices, e.g. modems and the like.

In the past, attempts were made to distribute the multiplexed and filler data bit locations equally within a frame. This was done to more equally separate the data bits fed to the DEMUX FIFO. However, even with this smoothing, the clock generators utilized in the prior art produced clock signals which have unacceptably slow rates, high jitter and other shortcomings.

Because of these undesirable characteristics, it has been difficult for the prior art systems to achieve a totally synchronous, locked-in operation. Moreover, these prior art systems were unstable inasmuch as they would continually sweep or hunt on or about the nominal isochronous frequency. This hunting gave an oscillatory, unstable aspect to the operation of the prior art systems. Consequently, new and improved systems of this type are highly desirable.

SUMMARY OF THE INVENTION

The instant invention is directed to a system for reproducing an isochronous clock signal. The multiplexing portion of the system is similar to that known in the prior art. However, the demultiplexing (demuxing) technique is quite unique. Instead of depending upon a particular signal from a shift register (FIFO) to control the clock frequency, this invention provides a system wherein a phase locked loop operation is achievable. This is accomplished by, basically, deriving information from the up-date rate of the filler data. More particularly, the system counts the number of frames of signal transmission and the number of filler data bits, thereby establishing a clock frequency based thereupon. The system of the instant invention substantially eliminates any hunting or oscillation by the clock signals which are generated.

BRIEF DESCRIPTION OF THE DRAWINGS

FIG. 1 is a schematic diagram of a system which is known in the prior art.

FIG. 2 is a timing diagram pertaining to the operation of the system shown in FIG. 1.

DESCRIPTION OF PREFERRED EMBODIMENTS OF THE INSTANT INVENTION

Figure 3:
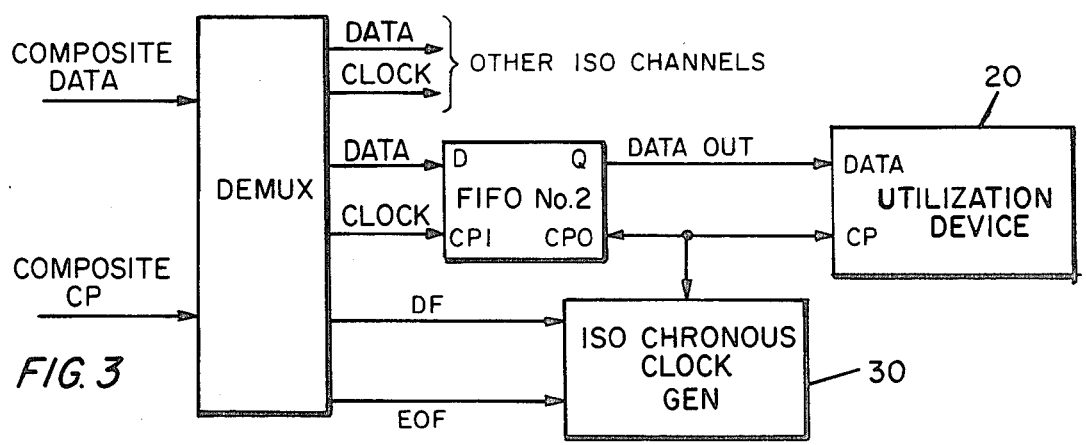
FIG. 3 is a block diagram of the demultiplexing portion of the system of the instant invention.

Referring now to FIG. 1, there is shown a clock signal generating system which is known in the prior art. This system is used to produce an isochronous clock signal. The isochronous clock signal is used, primarily, as part of an interfacing operation between two data systems. More particularly, the isochronous clock signal is used with data systems which operate on similar types of data but with different clock frequencies. In other words, the systems are not synchronized by means of a common clock signal producing circuit. In the past, generation of the isochronous clock signal has been done by multiplexing the data from the input system into a higher signal rate channel by using bit stuffing techniques. This has required the system to provide control bits, data filler bits, filler bits which do not contain data, and the normally applied data bits.

The prior art system shown in FIG. 1 develops a channel frame which is a sequence of bits in a serial data stream that contains a sync code or other means for the demultiplexer to identify a frame start. The frame normally ends with the occurrence of the next sync code. The data bits contained between the sync codes are designated as channel inputs, control data and filler bits. The channel frame is time division multiplexed (TDM) into the higher rate at the input end of the channel and then time division demultiplexed (TDD) at the other end of the data channel. In order to do this, the system must interpret the control bits to determine if information has been sent on the data filler bits. That is, the system must interpret the filler bits to determine which of those include data and are to be used and those which do not include data and are not to be used.

Referring concurrently to FIG. 2, there is shown a timing diagram for the operation of the DEMUX portion of the system shown in FIG. 1. The frame signals are generated by the DEMUX locking to the multiplexed data format. The frame signals are indicative of proper operation in the DEMUX. During each register format frame, the DEMUX circuit produces one isochronous data signal which is supplied to FIFO #2 in accordance with the clock pulses on terminal CPI. Each frame includes a number of bit positions which can be considered as true data or as mere filler. As shown in the enlarged representation of frame 2, additional pulses are supplied by the DEMUX to clock the filler data pulses into FIFO #2. These clock pulses are also supplied to the CP terminal of counter 11.

In the prior art system shown in FIG. 1, the input source 10 which may be a computer or the like, supplies data, in the form of binary pulses, as well as clock pulses. The data is supplied to the D input of FIFO #1 while the clock pulses (CP) are supplied to the input terminal (CPI) of FIFO #1. The Q output terminal of FIFO #1 is connected to the DATA terminal of the multiplexer (MUX) while the clock pulse output (CPO) terminal of FIFO #1 is connected to the clock (CP) terminal of the multiplexer. In addition the "½ FULL" terminal of FIFO #1 is connected to the SEND FILLER DATE terminal of the MUX. Other channels of a similar nature can be connected to the multiplexer as suggested in FIG. 1. The sync signal is supplied to the MUX from the sync generator to provide the frame sync signal that defines the frame start to the DEMUX.

The COMPOSITE DATA output signal is supplied from the MUX to the DATA terminal of the demultiplexer (DEMUX). In similar fashion, the composite clock pulse, COMPOSITE CP, is supplied to the clock terminal CP of the demultiplexer.

The DATA output of ISO CHANNEL #1 of the demultiplexer is supplied to the data terminal D of FIFO #2 with the corresponding clock signals CP applied to the clock pulse input terminal CPI of FIFO #2. Other channels also receive DATA and CP signals as shown. The output terminal Q of FIFO #2 is connected to provided the output signal DATA OUTPUT to the data input terminal of the utilization device 20. In addition, the clock pulse output terminal CPO is connected to the clock input terminal of the utilization device 20.

The ½ FULL terminal of FIFO #2 is connected to the counting terminal (UP/DOWN CONTROL) of the counter 11. The clock pulse terminal CP of the up/down counter 11 also receives the clock signal CP which is supplied to the CPI terminal of FIFO #2.

The output terminals of the counter 11 are connected to the input terminals of the digital-to-analog converter (DAC) 12. The output terminals of the DAC 12 are connected to the input terminal of the voltage controlled oscillator (VCO) 13 which has the output thereof connected to the clock pulse output terminal CPO of FIFO #2 and to the clock pulse terminal CP of the utilization device 20.

In operation, the input source 10 supplies data and clock pulses to the FIFO #1. The data signals propagate through the shift register which makes up FIFO #1 in response to the clock pulses CP and exit at the Q terminal where they are applied to the DATA terminal of the MUX. In this embodiment, a fixed number of bits are extracted from FIFO #1 and supplied to the MUX during each frame of multiplexed data signals. However, no filler data bits are sent by the MUX until FIFO #1 reaches the ½ FULL state and the ½ FULL signal goes high. At this time, a predetermined number of filler data bits are extracted from FIFO #1 along with the normal multiplexed bits and supplied to the multiplexer. Of course, the appropriate control bits are provided along with the frame signals as shown in FIG. 2 so that the DEMUX can correctly operate on the data sent.

The data is produced by the DEMUX in the order and time sequence in which it is received. The placement of the data bits in the frame format is not usually symmetrical even in the absence of filler data bits. The addition of the filler data bits compounds the symmetry problem because of the addition of two or more filler data bits. Also, as noted, the clock pulse in the DEMUX (i.e., the composite clock) is different from the clock pulse in the utilization circuit. Therefore, the isochronous channel data and clock pulses are "bursted" out of the DEMUX. This means that the bits may be output adjacent to each other and at the composite rate. That is, when filler data is sent, the multiplexed ISO bit would be received during period 12 then two consecutive filler data bits would be output during time periods 16 and 17. Typically, the user equipment is unable to accept this type of data, and can use only a symmetrical clock with low jitter.

However, there can be large variations in clock periods because of the presence of ISO MUX bits in every frame and only the periodic presence of filler data bits. Thus, it is frequently difficult to generate a stable and symmetrical clock with conventional circuitry. Therefore, it has been the practice, in the past, to use a very long counter, e.g. 16-24 bits in order to minimize the effect of any single pulse variation.

When FIFO #2 has reached the half full condition, a signal is provided at the ½ FULL terminal and is supplied to the UP/DOWN terminal of counter 11. This signal is clocked into the counter thereby to alter the contents thereof when a CP signal is supplied.

The digital to analog converter 12 then converts the revised count from counter 11 into an analog voltage signal. This voltage signal is supplied to VCO 13 which produces an output signal of an appropriate frequency. The output of the VCO 13 is connected to the CPO terminal of FIFO #2 to clock out the data stored in FIFO #2 at the rate established by the frequency of the signal produced by VCO 13.

The inherent difficulty with this scheme is that the clock generator circuit tends to "hunt" around the nominal clock frequency because of the variations produced by the ½ FULL signal. Thus, a settled condition is not readily achieved. Also, as a result of the "hunting" by the clock signal, the flow of information into the utilization device 20 is somewhat erratic and is not very smooth, as would be desired. The hunting effect can be reduced somewhat by making the counter 11 quite long, as noted above, but this is not satisfactory because of excessive acquisition times.

Referring now to FIG. 3, there is shown a block diagram of one embodiment of the improvement provided by the instant invention. In this diagram, the instant invention is shown to be primarily in the DEMUX or output portion of the isochronous channel. It can be considered that the input portion of the system is similar to the input MUX circuit portion shown in FIG. 1. Thus, the DEMUX circuit receives the COMPOSITE DATA and COMPOSITE CP signals from the multiplexer (MUX) as shown in FIG. 1.

As before, the demultiplexer provides the DATA output signals and the CLOCK output signals to one or more isochronous channels. In the channel shown, these signals are supplied to the D terminal and the CPI terminal, respectively, of FIFO #2. Also, the DATA OUT signal is supplied on the Q terminal and the output clock signal is supplied on the CPO terminal of the FIFO #2. As before, these signals are supplied to a utilization device 20. However, in this case, the data filler signal DF is supplied from the DEMUX to the isochronous clock generator circuit 30, rather than to the FIFO #2. The signal DF indicates that filler data was received during this particular frame and is not the actual data which, of course, is stored in FIFO #2. Likewise, the END OF FRAME signal EOF is also supplied from the DEMUX to the clock generator 30. These signals are readily available in the existing circuitry. The output of the clock generator circuit 30 is connected to the CPO terminal of the FIFO #2. It is noted that the ½ FULL signal of the FIFO is not sampled or detected in this system.

Figure 4:
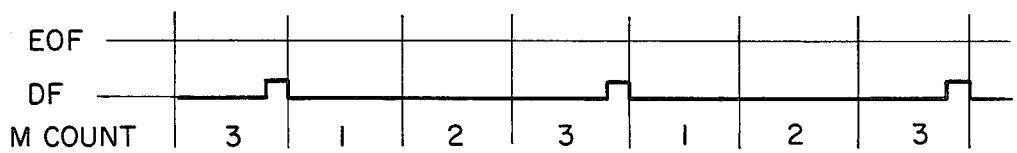
FIG. 4 is a timing diagram associated with the circuit portion shown in FIG. 3.

Referring concurrently to FIG. 4, the EOF signals from the DEMUX are used to trigger the clock generator 30 and to indicate the end of a timing frame during which data pulses are supplied to the FIFO #2. The EOF signals are the same as the sync signals shown in FIG. 2 and are supplied every frame. Likewise, filler data signals DF are supplied to the clock generator 30. These signals are supplied during bit positions 16 and 17 and retained until the EOF of certain of the frames (see FIG. 2). Thus, FIG. 4 shows a specific representation of the signal train shown in FIG. 2.

By monitoring the information which is inherently carried in the filler bits and the frame rate, the number of frames between data filler bits can be determined. This number is referred to as the M count. Inasmuch as the frame rate is essentially constant, the EOF signal can be used as a reference signal. With these two pieces of information, i.e. frame rate and number of frames between the filler bits, it is possible to reconstruct the clock rate.

Figure 5:
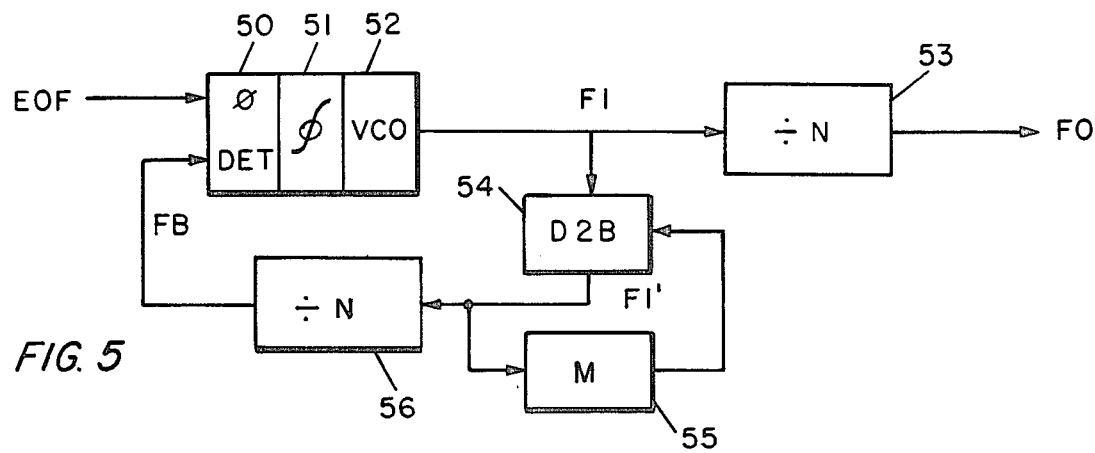
FIG. 5 is a schematic diagram of one embodiment of the isochronous clock generator circuit of the instant invention.

Referring to FIG. 5, there is shown a detailed circuit diagram of one type of isochronous clock generator. In this case, the END OF FRAME signal, EOF, is supplied to a phase detector 50. The phase detector is connected to an integrator 51 to obtain an average phase signal. The output of the integrator is supplied to a voltage controlled oscillator (VCO) 52 which produces a frequency output signal F1 which is a function of the voltage supplied by the integrator. The output signal F1 is supplied to a divider circuit 53 which divides by N (where N equals 8 in this embodiment) to produce an output signal FO.

In addition, the signal F1 from the VCO 52 is supplied to the D2B circuit 54 which represents a "drop 2 bits" circuit. This circuit 54 has the effect of deleting or dropping two bits of the signal supplied thereto, thus, producing a signal of frequency F1'.

The output signal F1' from the D2B circuit is supplied to two different divider circuits. The divide by M circuit 55 is arranged to be connected back to the D2B circuit to selectively provide an inhibit signal thereto. This inhibit or disable signal causes the two bits to be dropped by the D2B circuit 54 each time it is applied.

In addition, the F1' signal is supplied to the divide by N circuit 56 wherein N=8. This divided signal, or feedback signal FB, is returned to an input of the phase detector 50 where it is compared with the frame signal EOF and produces the necessary correction signals to phase lock the FB signal with the EOF signal.

Figure 6:
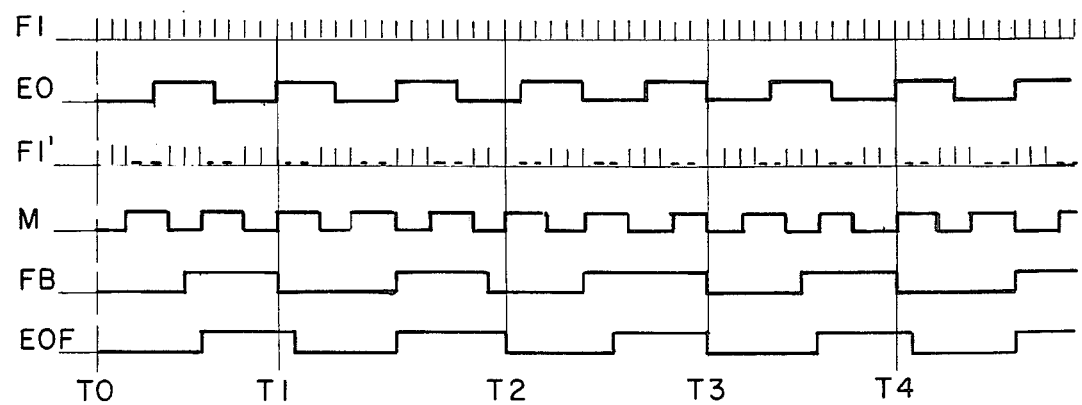
FIG. 6 is a timing diagram showing the signals used and produced by the circuit shown in FIG. 5.

The operation of the circuit shown in FIG. 5 is illustrated by the timing diagram for clock generator signals shown in FIG. 6. Each of the time periods T0, T1, T2 . . . in FIG. 6 represents frame periods for the signals from the DEMUX. The signal F1 is produced by VCO 52 at a relatively high rate of, for example, 10 MHz. The divide by N circuit 53 produces the FO signal which is, in this embodiment, ⅛ the frequency of the F1 signal. In this case, the FO signal is approximately 1.25 MHz.

The F1 signal is also supplied to the D2B circuit 54 where it will selectively "drop two bits." The circuit 54 passes the signals F1 therethrough unless disabled. The signals from the D2B circuit are supplied to the divide by M circuit 55. (In this case M=3.) Thus, at the end of the third signal through the D2B circuit, the divide by M circuit 55 provides an inhibit signal to the D2B circuit wherein no signal passes through the D2B circuit for two time periods of F1. After two time periods for the F1 signal, a clock signal is again applied to the divide by M circuit the output of which now switches to the low level and removes the dump two bits from the D2B circuit. (A suitable circuit embodiment is described infra.) The signals are then again applied to divide by M circuit 55 and the sequence continues. Because of the obvious change in frequency, the output signal from the D2B circuit is referred to as F1'. This arrangement provides the signal ratio of F1/F1' or 5/3 which is the ratio of the isochronous frequency to the frame rate, assuming at least one multiplexed bit per frame.

In addition, the signal train F1' from the D2B circuit 54 is supplied to the divide by N circuit 56 which is operative to divide the signals supplied thereto by 8. Thus, the signal FB is produced thereby. Signal FB, therefore, is ⅛ the frequency of the signal F1'. That is, the signal FB completes one full cycle in response to 8 pulses of signal F1' from the D2B circuit 54.

The signal FB is returned to the phase detector 50 and compared with the EOF input signal to force the VCO 52 to change the FB signal to the exact frequency and average phase of EOF. By dumping bits at the high frequency F1 and then dividing by N to produce the signal FB, a severe jolt to the phrase locked loop is avoided. By keeping the relative phase differences small, the circuit will operate as a normal phase locked loop with a low bandwidth and reduced output jitter.

With the continued operation of this circuit, the phase detector 50 and integrator 51 produce a voltage which the VCO 52 turns into a signal of frequency F1 whereby the signal FB and EOF are forced into a phase lock arrangement. Once the signals become phase locked, they tend to produce a very closely coordinated output signal FO. In this embodiment, FO is equal to 5/3 EOF. That is, $$\frac{F_{ISOC}}{F_{frame}} = \frac{F_I}{F_I'} = \frac{NF_o}{NF_B} = \frac{F_o}{F_B} = \frac{F_o}{F_{EOF}}$$

(because the feedback frequency $F_B = F_{EOF}$.) Thus, $F_O = F_{ISO}$ and the isochronous rate (frequency) has been reconstructed.

Figure 7:
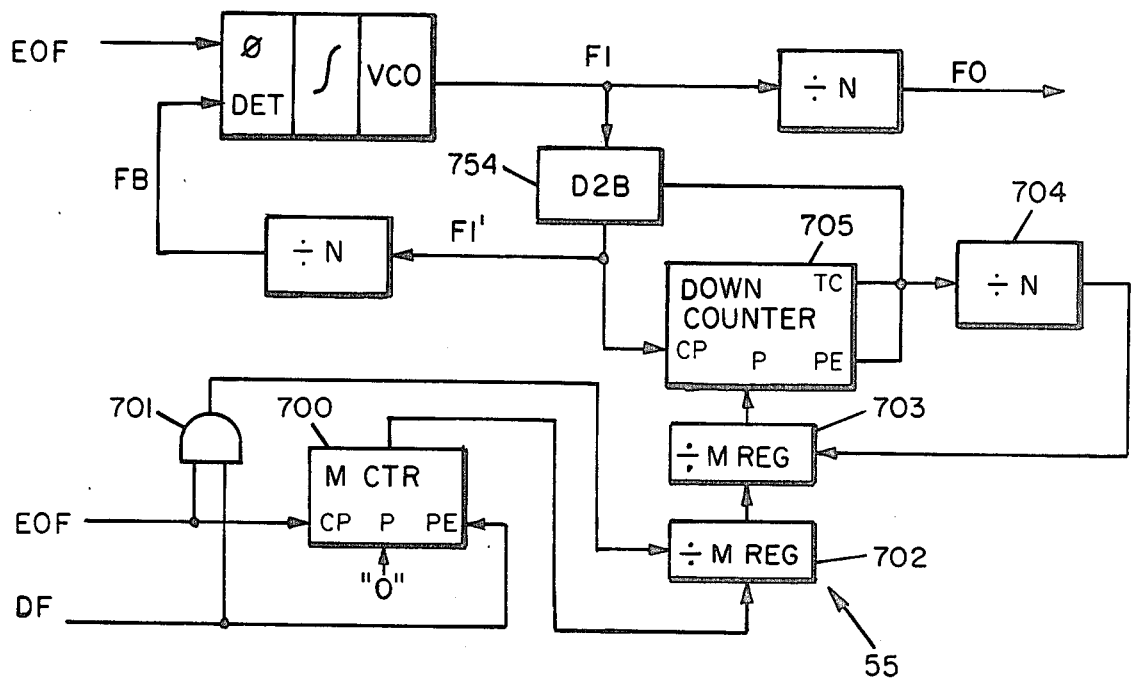
FIG. 7 is a more detailed schematic diagram of the embodiment of the instant invention shown in FIG. 5.

Referring now to FIG. 7, there is shown a more detailed version of the circuit shown in FIG. 5. The circuit shown in FIG. 7 is provided with suitable circuitry for arriving at the number M for the divide by M circuit 55. However, the divide by M circuit is relatively easily established inasmuch as the EOF signals and the filler data signals DF are, as noted, readily available from the DEMUX circuit. These signals are supplied to the M counter 700. That is, with the application of a filler data signal DF to the parallel enable terminal PE, a count of "0" is loaded into the M counter 700 in response to the trailing edge or termination of the EOF signal. That is, the counter reacts only to the trailing or falling edge of the CP. The EOF signal is supplied to the clock pulse terminal CP of the counter 700. Thus, counter 700 counts the EOF pulses which are supplied thereto and stores this count therein until the counter is reset to 0 by the application of another DF signal. Thus, the number M of frames between filler data signals is counted.

In addition, each of the signals EOF and DF is supplied to the And gate 701. When these signals are present simultaneously, the M register 702 is activated to transfer in and store the M count from the M counter 700.

The count stored in the M register 702 is also supplied to and stored in the divide by M register 703 in response to the application of a signal to the clock pulse terminal CP from the divide by N circuit 704. The signals from the divide by M register 703 are applied to the pre-set terminals P of the down counter 705. The divide by N circuit 704 is connected to receive output signals from the counter 705. These output signals are also returned to the parallel enable terminal PE of counter 705.

As shown in FIG. 7, the F1' signal is supplied to the clock pulse terminal CP of down counter 705. As each pulse is supplied, the counter contents are reduced by one. When the down counter reaches 0, a signal is supplied to the D2B circuit 754 which is inhibited thereby and passes no signals.

The M counter 55 portion of the circuit continues to count the EOF signals and the filler data signals DF and to store this count in the M counter 700 and the M register 702, the divide by M register 703 and so forth until new counts are supplied to the down counter 705. (This operation is at a relatively low frequency as compared to rate at which counter 705 is operating.) When the new counts are supplied, the output of the down counter 705 is supplied to D2B circuit 754 to reinitiate the operation thereof and to permit the F1 signals to pass through as the F1' signals.

Also, the output at the TC terminal of counter 705 is returned to the parallel enable terminal PE thereof. This signal has the effect of pre-setting the counter contents to the number stored in the divide by M register 703 when counter 705 has counted down to zero.

The output signal at the terminal TC of the down counter 705 is also supplied to the Divide by N circuit 704 which, after being divided by N, is returned to the clock pulse terminal CP of the Divide by M register 703. This has the effect of repeating the circuit operation N times. In other words, the M count representation in register 703, which has been determined, is recycled through the down counter (in response to the TC signal) N times until the divide by N circuit 704 supplies a clock pulse to the divide by M register 703 to permit a new count to be installed therein from register 702. This new value of M is then supplied to counter 705 upon the occurrence of the next TC signal.

Typically, the rate at which the circuit is updating (i.e. the divide by M register 703 update) is the same rate, on the average, as the counter 700 is being updated. Thus, no information is lost and the system remains locked on the proper input signal. That is, each M is counted down N times with no values of M being lost.

In another embodiment (not shown) of the instant invention which provides a smoothing in the M counting operation, the divide by M register is provided in the form of a plurality of shift registers. Usually, a prime number of registers is used to assure proper control over the M number contents of the registers. These registers can be recursive filters or the like which provide a low pass filter technique for the system and which are selectively multiplexed in accordance with the output from the M register 202. In addition, a shift register control circuit is connected to supply control signals to the multiplexer and to the respective shift registers in accordance with input signals supplied by the EOF signal, the filler data signal and from the repeat counter or divide by N circuit as in the embodiment shown in FIG. 7.

In the embodiment shown in FIG. 7, the M count is utilized N times to direct the operation of down counter 705. However, this may not take into accurate account variations in M which may be occurring in the instantaneous operation of the circuit. This may be disadvantageous in older applications (as dictated by the utilization device) wherein M can alternate between 8 and 1 on instantaneous measurements while still very closely approximating the correct value of M on an average basis. Of course, this average is acceptable but the individual or instantaneous values could adversely affect the phase locked loop and, possibly, destroy the lock.

Figure 8:
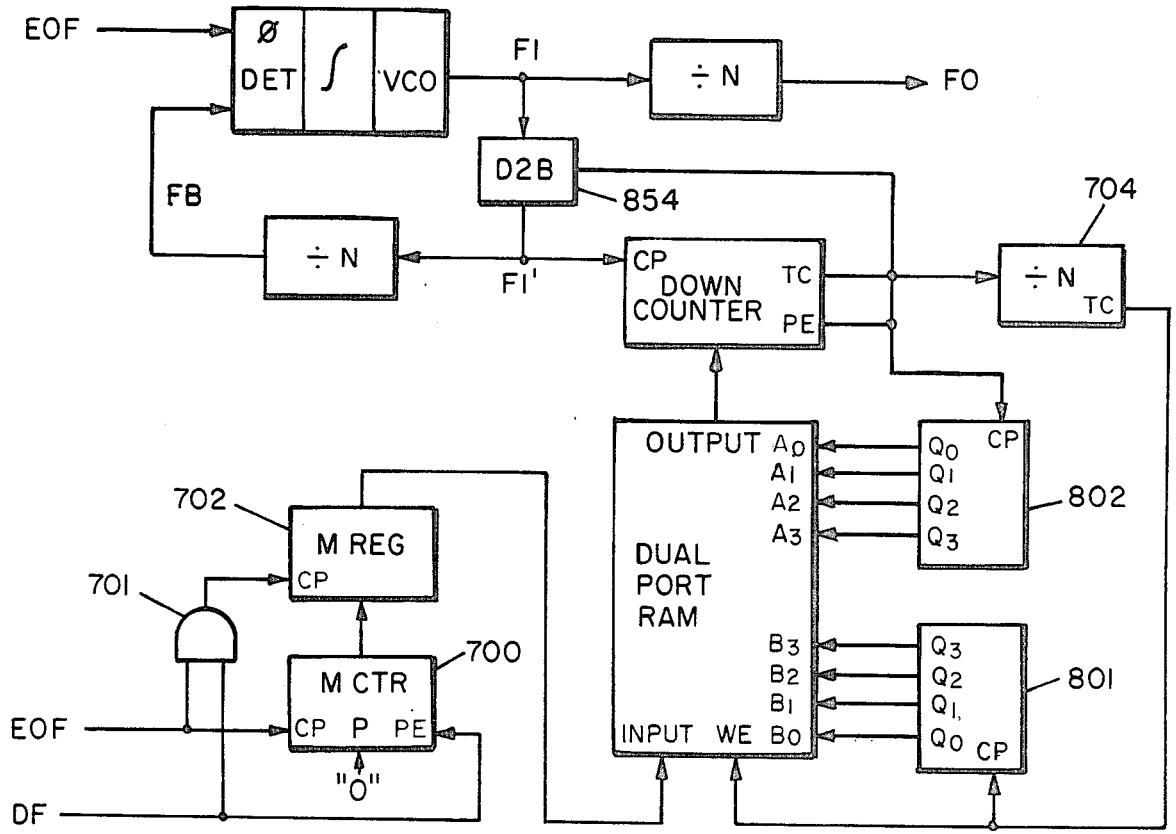
FIG. 8 is a schematic diagram of another embodiment of the instant invention.

To avoid the aforementioned difficulties, the circuit embodiment shown in FIG. 8 includes M storage registers which operate to smooth the frequency output. The storage registers are provided in a RAM. This circuit acts as a low pass filter by saving the number M in the Random Access Memory (RAM) stack 800 which includes counters 801 and 802. The stack can be any depth, but is preferably 16 or greater in order to provide greater smoothing of operation by averaging of the same number of M values so that a variation in M would be DM/16 or less.

The operation of the circuit shown in FIG. 8 is very nearly the same as the circuit shown in FIG. 7. It is the same in that the M counter 700 counts the value of M then loads that value into the M register 702 under control of gate 701 when filler data DF is received. In other words, this circuit also counts the number of frames between filler data.

Again the M value is saved in M register 702 waiting for the M down counter 705 to request new data. This occurs when the M down counter 705 stores the current value of M, and then counts down to zero in response to the F1' signal. Then the terminal count signal of the down counter 705 will go high thereby dropping two bits in the D2B circuit 854 as described above. Also, the terminal count signal at terminal TC causes counter 705 to parallel enter the next value of M from the Ram stack 800. Also, there is a connection from the TC terminal of counter 705 to the Ram output address counter 802 and also to the divide by N (or repeat) counter 704.

The operation of the sixteen location, dual port Ram 800 and associated address counters 801 and 802 is described as follows. The dual port Ram contains 16 addressable locations. Terminals Q0 through Q3 of counter 802 are connected to the Ram output address terminals A0 through A3, respectively. The clock terminal CP of counter 802 is connected directly to the TC output of counter 705 and is clocked thereby. Therefore, as the counter 802 addresses one of the sixteen Ram locations, the divide by M down counter 705 will load the selected M value from RAM 800 when the counter 705 has counted down to zero. The TC signal of counter 705 is also applied to address counter 802, which will be advanced at the end of the TC signal. In this manner counter 802 sequentially addresses each location where a value of M is stored in Ram 800 and thereby presents each value of M to counter 705 to be counted down.

The input address of Ram 800 is selected by counter 801. That is, the output terminals Q0 through Q3 of counter 801 are connected to the input address terminals B0 through B3, respectively, of Ram 800. The input write command WE is determined by the terminal count TC of the N counter 704. The terminal count of counter 704 also advances the contents of input address counter 801. As each new value of M is received by register 702, it is sequentially stored in the Ram 800, thus, replacing the oldest value of M in the Ram.

Thus, the Ram circuit 800 acts as a low pass filter and smooths out the M values which will vary somewhat. In the older prior art systems there may be variations such as M=16 followed by M=1 and a 16 and a 1, and so forth. The new system, for the same isochronous inputs, will have M values of an 8, and an 8, and so on. In some cases, where frequencies are not even intervals or multiples, the frame rate M may be 8; 8; 9; 8; 8; and so on. Thus, the variations are quite small.

Figure 9:
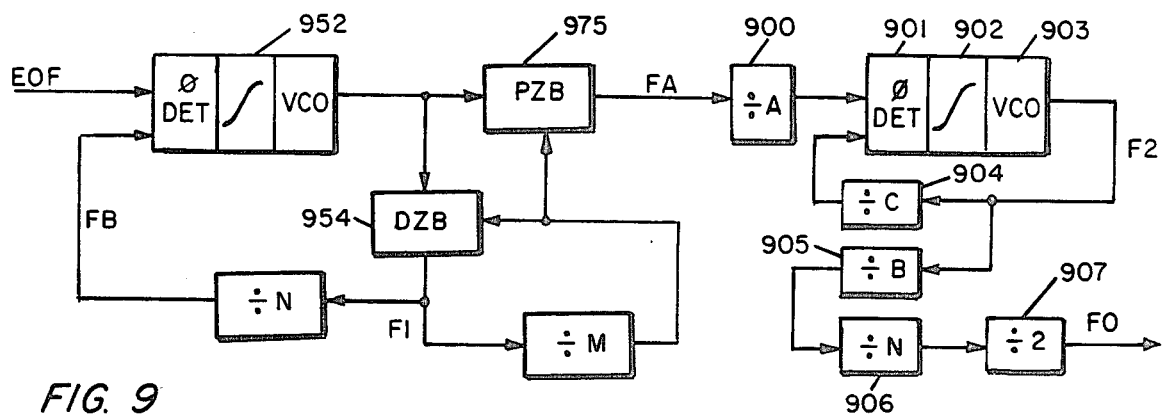
FIG. 9 is a block diagram of another embodiment of the instant invention.

Reference is now made to FIG. 9 which is a schematic representation of a circuit which operates on the filler data signals only. The embodiments shown and described above assumed that at least one data bit was provided during the multiplex frame. If, on the other hand, the isochronous channel is operating at a data rate which is less than the frame rate, it is necessary to run the main loop as though one multiplexed bit was present. This can be seen in FIG. 9, where the phase detector reference input is the frame rate signal EOF. Therefore, if the loop is to attain phase lock, the signal FB must also equal the frame rate. Likewise, the signal F1 must have a frequency of N times the frame rate EOF. The D2B (dump two bits) circuit 954 increases the frequency of F1 by N times the isochronous rate because of the divide by M counter control. These conditions can be shown by setting DF equal to the number of filler data bits. The number two has been used in all prior examples, but any number could be used.

Accordingly, the relationship is then:

$$F_1 = F_1'\left(1 + \frac{DF}{M}\right) = F_1'\left(\frac{M + DF}{M}\right)$$

$$\frac{F_1}{F_1'} = \frac{F(ISO)}{F(EOF)} = 1 + \frac{DF}{M} = \frac{M + DF}{M}$$

or $$\frac{F_1}{F_1'} = \frac{N \cdot F(ISO)}{N \cdot F(EOF)}$$

Thus, $F_1 = N\ F(ISO)$ and $F_1' = N\ F(EOF)$

The mechanism for increasing F1 above F1' is the Divide by M circuitry dumping bits from F1. If one mux bit was not assumed, the FB signal would be equal to zero and the loop could not lock.

In the embodiment shown in FIG. 9, the two bits dumped from the feedback signal FB, are the only two bits which pass to the output, through the "pass 2 bits" (P2B) circuit 975, as the signal FA. The signal FA is, of course, lower in frequency than the F1 signal (which is the output of the VCO 952). Because the signal FA is no longer a symmetrical wave or signal, but has one or more bits per period of M deleted, it is supplied through a narrow bandpass filter which is centered about a frequency that is established by the output frequency FA which is the average center frequency. The actual number of bits deleted depends upon the value of M. Since two bits are output by the P2B circuit at the termination of each M count, at least one F1 period will be deleted (when M=1). If M=2, then two periods (clocks) of F1 will be deleted for each two passed.

In operation, signal FA is fed to the divide by A circuit 900. The main purpose of circuit 900 is to lower the frequency of signal FA so that phase detector 901 can handle it properly. If signal FA and phase detector 901 are compatible, circuit 900 can be eliminated. The divided FA signal acts as a reference input signal to the phase detector. The divide by A circuit 900 also lowers the phase shift by whatever the phase shift is, divided by A. Thus, the asymmetrical signal FA is divided by A and becomes periodic. If the phase variation of signal FA is 360° and A is equal to 2, the phase variation supplied to detector 901 is 180°.

The phase detector 901, the integrator 902 and the VCO 903 are standard phase locked loop elements similar to those components used in the main phase lock circuit. The output of the VCO 903 is fed back, via a divide by C circuit 904, which is, typically, a constant divide circuit with the value of C=1024. This value is determined so as to contain or maintain the VCO 903 within its operating range which, in this embodiment, is in the range of 2 to 10 MHz. The Divide by A and Divide by C circuits can be variable in some applications. In general applications the values of A, B and C would all be variable.

The signal F2 produced oy VCO 903 is then divided by B such that signal F2 represents the average frequency of input signal FA with the large discontinuities removed. The Divide by B circuit 905 scales the frequency of signal F3 properly such that it is 2N×FO when supplied to the divide by N circuit 906. The divide by 2 circuit 907 is used to make FO symmetrical because the signal produced by the divide by N circuit can be a non-symmetrical signal.

Figure 10:
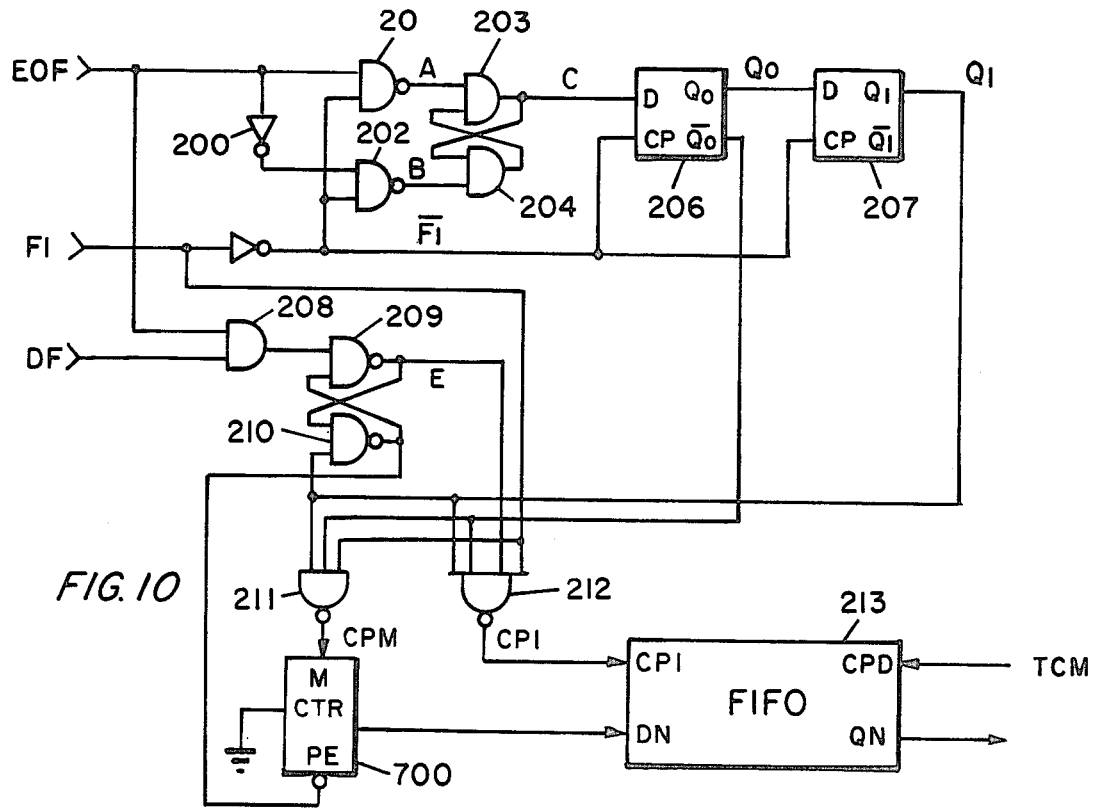
FIG. 10 is a logical block diagram of another embodiment of the instant invention.
Figure 11:
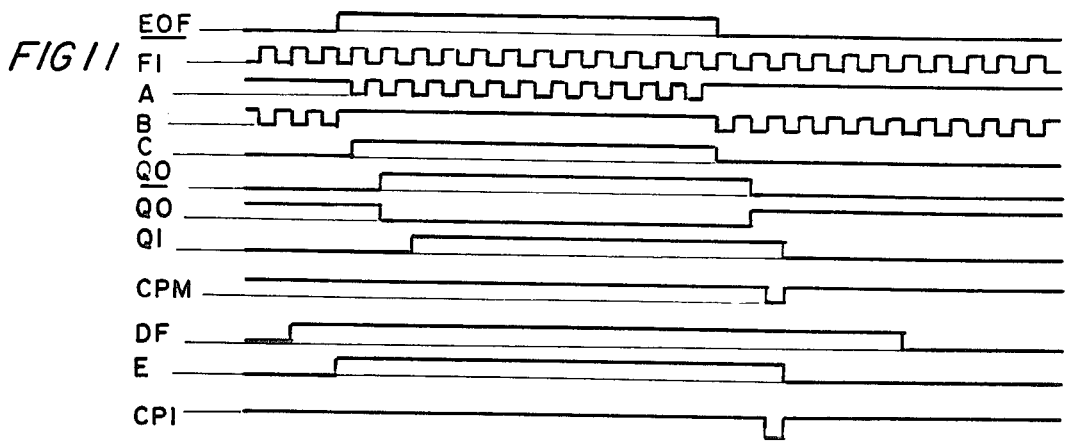
FIG. 11 is a timing diagram associated with the embodiment shown in FIG. 10.

FIG. 10 shows another embodiment of the input circuitry using a FIFO as the M register. Concurrent reference is made to FIG. 11 which shows the timing of the various signals produced for and by this circuit embodiment. The signals EOF and DF are supplied by the DEMUX as before. The signal F1 is the VCO output as shown in FIG. 8. The EOF rate is, typically, of the order of 8 KHz, while, typically, F1 will be from 2 MHz to 10 MHz. Also, the signal DF will be a submultiple of the EOF signal. Since the EOF and F1 signals are not necessarily synchronous, EOF cannot be connected to the D input of a flip-flop which receives the signal F1 as a clock without violating the setup or hold times. When this event happens, the flip-flop goes into a metastable state in which the output produced by the flip-flop remains in an undetermined state for an extended time. The circuitry comprised of inverters 200 and 205 as well as gates 201 through 204 insures that the signal C at the D input of flip-flop 206 is stable at the positive going edge of the clock signal. When EOF goes from the low to the high state, the output of Nand gate 201 will go low only if the signal F1 is also in a high state. When both conditions are true (high), the output signal A of gate 201 will go low and, the output signal C of gate 203 will be driven high. The output of gate 203 will remain in the high state after the removal of the low signal from the input of gate 201, due to the low state now existing on the output of gate 204. The cross-coupled Nand gates 203 and 204 will remain in this state until EOF returns to a low state which will produce a low output signal B on gate 202. Since the cross-coupled Nand gates 203 and 204 can only change state when signal F1 is high, the critical setup and hold times of flip-flop 206 will never be violated.

Flip-flops 206 and 207 provide an EOF trailing edge detector to generate a clock pulse CPM for the M counter 700 through Nand gate 211. When filler data has been received by the DEMUX, the DF signal will be present sometime during EOF and supplied to gate 208. The low state produced by Nand gate 208 in response to the concurrent application of the EOF and the DF signals, will set the cross-coupled Nand gates 209 and 210 to produce a high signal E. This high signal on the output terminal of gate 209 will produce a clock pulse CPI from gate 212 to store the current value of the M counter 700 into the M register 213 which is a 4 or greater stage FIFO in this embodiment. When the clock pulse occurs, it will be simultaneous with the M counter clock CPM produced by gate 211. That is, gates 211 and 212 receive the same input signals. The M counter 700 will also be reset to zero through gate 210 when DF is received. Changing the M register 213 from a single stage storage register to a four stage FIFO allows for variations when the DF signal is sent (M varying), during acquisition by the phase locked loop. Analysis and simulation shows that a variation of two EOF periods can occur between the EOF and FIFO output clock.

Thus, there is shown and described a new and unique isochronous clock generator circuit. This circuit provides for very accurate and reliable production of clock signals for system portions which must interact but which may not be synchronized with a common clock signal. The description is directed to the general inventive concept and to various specific embodiments thereof. Anyone skilled in the art may devise modifications to the embodiments described. However, any such modifications which fall within the purview of these descriptions are intended to be included therein as well. The descriptions are intended to be illustrative only and are not intended to be limitative. Rather, the scope of the invention is intended to be limited only by the claim appended hereto.

We claim:

1. An interfacing system comprising,
   demultiplexing means,
   storage means connected to receive signals from said demultiplexing means which include digital fill bits, and
   isochronous clock generator means connected to receive signals from said demultiplexing means and to supply clock signals to said storage means to control the production of digital time signals by said storage means wherein,
   said isochronous clock generator means comprises,
   phase lock loop means which receives and locks upon the digital time signals supplied thereto by said storage means,
   said phase lock loop includes phase detector means connected to receive and said digital time signals from said storage means and a digital feedback signal from the output of said phase lock loop means for producing a phase signal representative of the phase relationships of said digital time and feedback signals,
   integrator means connected to said phase detector means for producing a voltage signal representative of the phase signal produced by said phase detector means,
   voltage controlled oscillator (VCO) means connected to receiving the voltage signal from said integrator means for producing a digital output signal having a pulse repetition frequency that is representative of the voltage signal produced by said integrator means, and
   feedback loop means connected between the output of said VCO means and the input of said phase detector means for supplying said feedback signal comprising signal adjustment means for adjusting the frequency signal produced by said VCO means as a function of said fill bits.

* * * * *